(12) United States Patent
Mayer

(10) Patent No.: US 8,550,026 B2
(45) Date of Patent: Oct. 8, 2013

(54) CONICALLY GRADUATED DISPLAY INSTRUMENT FOR A MOTOR VEHICLE

(75) Inventor: Martin Mayer, Sinsheim (DE)

(73) Assignee: Johnson Controls Automotive Electronics, Remchingen (DE)

( * ) Notice: Subject to any disclaimer, the term of this patent is extended or adjusted under 35 U.S.C. 154(b) by 606 days.

(21) Appl. No.: 12/528,214

(22) PCT Filed: Feb. 26, 2008

(86) PCT No.: PCT/EP2008/001511
§ 371 (c)(1),
(2), (4) Date: Sep. 14, 2010

(87) PCT Pub. No.: WO2008/104365
PCT Pub. Date: Sep. 4, 2008

(65) Prior Publication Data
US 2010/0326347 A1 Dec. 30, 2010

(30) Foreign Application Priority Data

Feb. 27, 2007 (DE) .......................... 10 2007 009 496
Aug. 20, 2007 (DE) .......................... 10 2007 039 327

(51) Int. Cl.
*G01D 13/04* (2006.01)
*G01D 13/22* (2006.01)

(52) U.S. Cl.
USPC .......... 116/62.1; 116/303; 116/328; 116/331; 116/DIG. 6

(58) Field of Classification Search
USPC ................. 116/284, 286, 287, 288, 294, 295, 116/297, 304, 328, 331, 332, 62.1, 62.4, 116/DIG. 5, DIG. 6, 303
See application file for complete search history.

(56) References Cited

U.S. PATENT DOCUMENTS

| | | | | |
|---|---|---|---|---|
| 3,722,459 A | * | 3/1973 | Kisselmann et al. | 116/287 |
| 3,796,101 A | * | 3/1974 | Howard | 374/111 |
| 4,201,148 A | * | 5/1980 | Bizzak | 116/241 |
| 5,205,635 A | | 4/1993 | Van Order et al. | |
| 5,295,049 A | * | 3/1994 | Terada | 362/27 |
| 5,803,240 A | | 9/1998 | Swidersky et al. | |
| 6,417,779 B1 | | 7/2002 | Noll et al. | |
| 6,598,988 B1 | | 7/2003 | Noll et al. | |
| 6,601,532 B1 | * | 8/2003 | Olbrich | 116/288 |
| 6,817,310 B2 | | 11/2004 | Sugiyama et al. | |
| 7,098,897 B2 | | 8/2006 | Vakil et al. | |

(Continued)

FOREIGN PATENT DOCUMENTS

| DE | 839104 C | 5/1952 |
|---|---|---|
| DE | 3149826 A1 | 7/1983 |

(Continued)

OTHER PUBLICATIONS

Co-pending U.S. Appl. No. 12/525,759, filed Aug. 4, 2009.

(Continued)

*Primary Examiner* — R. A. Smith
(74) *Attorney, Agent, or Firm* — The Dobrusin Law Frim, PC

(57) ABSTRACT

The invention relates to a pointer instrument comprising a graduated disk, a contour element which is arranged in the edge region of the disk and has a visible surface, and a pointer. The invention also relates to a method for producing a pointer instrument.

14 Claims, 1 Drawing Sheet

(56) References Cited

U.S. PATENT DOCUMENTS

Figure 1:
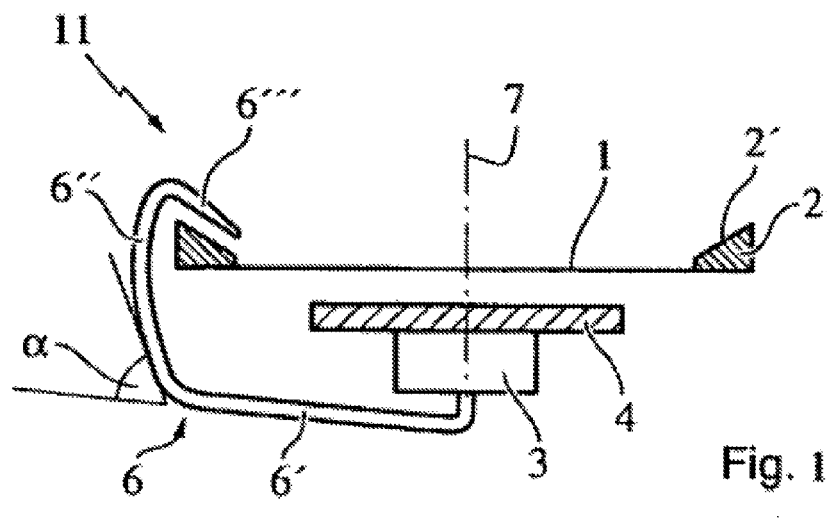

| | | | |
|---|---|---|---|
| 7,221,363 B2 | 5/2007 | Roberts et al. | |
| 7,530,702 B2* | 5/2009 | Luettgen et al. | 362/23 |
| 7,984,688 B2* | 7/2011 | Fournier | 116/288 |
| 2005/0052426 A1 | 3/2005 | Hagermoser et al. | |
| 2005/0109261 A1* | 5/2005 | Tanaka et al. | 116/300 |
| 2005/0134485 A1 | 6/2005 | Hein et al. | |
| 2006/0035073 A1 | 2/2006 | Funkenbusch et al. | |
| 2006/0132383 A1 | 6/2006 | Gally et al. | |
| 2006/0219155 A1* | 10/2006 | Honma et al. | 116/288 |
| 2009/0223436 A1* | 9/2009 | Werman et al. | 116/286 |
| 2010/0058976 A1* | 3/2010 | Mayer et al. | 116/297 |
| 2010/0154700 A1* | 6/2010 | Cramer et al. | 116/288 |
| 2010/0178460 A1* | 7/2010 | Pierce et al. | 428/140 |
| 2010/0211344 A1* | 8/2010 | Daurelle et al. | 702/88 |
| 2011/0182052 A1* | 7/2011 | Frens | 362/26 |
| 2011/0232563 A1* | 9/2011 | Ono et al. | 116/284 |
| 2012/0000413 A1* | 1/2012 | Ikarashi | 116/286 |

FOREIGN PATENT DOCUMENTS

| | | | |
|---|---|---|---|
| DE | 4321146 A1 * | 1/1995 | |
| DE | 4321416 A1 | 1/1995 | |
| DE | 19544578 A1 | 6/1997 | |
| DE | 19737679 A1 | 3/1999 | |
| DE | 19739628 A1 | 3/1999 | |
| DE | 19831893 A1 | 1/2000 | |
| DE | 20021111 U1 | 1/2001 | |
| DE | 10134365 A1 | 1/2003 | |
| DE | 102005003919 A1 | 9/2005 | |
| DE | 102005055906 A1 | 5/2007 | |
| DE | 102007024077 A1 * | 9/2008 | |
| DE | 102008028829 A1 * | 1/2009 | |
| EP | 1758070 A2 | 2/2007 | |
| EP | 1839945 A1 | 10/2007 | |
| EP | 2110834 A1 | 10/2009 | |
| FR | 2679988 A1 | 2/1993 | |
| FR | 2871230 A1 | 12/2005 | |
| JP | 2003014508 A | 1/2003 | |
| JP | 2006098160 A * | 4/2006 | |
| JP | 2006208081 A * | 8/2006 | |
| JP | 2006234618 A * | 9/2006 | |
| JP | 2008058222 A * | 3/2008 | |
| JP | 2010230326 A * | 10/2010 | |
| JP | 2011094984 A * | 5/2011 | |
| JP | 2012137462 A * | 7/2012 | |
| WO | 2004/102127 A1 | 11/2004 | |
| WO | 2006/002474 A1 | 1/2006 | |
| WO | 2006/005821 | 1/2006 | |
| WO | WO 2006005820 A1 * | 1/2006 | |
| WO | WO 2006024748 A2 * | 3/2006 | |
| WO | WO 2008001605 A1 * | 1/2008 | |
| WO | 2008/086215 A2 | 7/2008 | |
| WO | 2008/131305 A1 | 10/2008 | |
| WO | WO 2009019967 A1 * | 2/2009 | |
| WO | 2009/150546 A2 | 12/2009 | |
| WO | 2010/025160 A1 | 4/2010 | |
| WO | WO 2010098238 A1 * | 9/2010 | |

OTHER PUBLICATIONS

International Search Report, Application No. PCT/EP2008/001511, mailed Jun. 13, 2008, published as WO2008/104365.

Written Opinion, Application No. PCT/EP2008/001511, mailed Aug. 27, 2009.

* cited by examiner

CONICALLY GRADUATED DISPLAY INSTRUMENT FOR A MOTOR VEHICLE

CLAIM OF BENEFIT OF FILING DATE

The present application claims the benefit of the filing date of PCT Application Serial No. PCT/EP2008/001511 (filed Feb. 26, 2008) (Published as WO 2008/104365); DE 10 2007 009 496.7 (filed Feb. 27, 2007) and DE 10 2007 039 327.1 (filed Aug. 20, 2007), the contents of which are hereby incorporated by reference in their entirety.

The present invention relates to a pointer instrument having a graduated disk and a contour element in the edge region thereof—said edge region having a viewing surface—and a pointer. Furthermore, the present invention relates to a method for manufacturing a pointer instrument.

Many variants of pointer instruments with a three-dimensional contour element of the viewing surface are known. For example, the graduations of a speed display can be arranged on the contoured region. The graduations can be seen particularly well as a result of the contour element. Likewise, printer instruments are known in which the center part of the viewing surface is kept free of movable components, such as the pointer or the rotational axle supporting it. This is particularly advantageous in cases in which a further display element, for example a graphic display, which mainly occupies this center part, is located there. In these cases, a hook pointer is usually employed, said hook pointer being mounted or driven underneath the circular viewing surface and engaging around the graduated disk from the outside. However, in the case of pointer instruments with a contoured edge region these instruments cannot be manufactured.

The object of the present invention was therefore to make available a pointer instrument which has a contour element in the edge region and does not have the disadvantages of the prior art.

This object is achieved with a pointer instrument having a graduated disk and a contour element in the edge region thereof—said edge region having a viewing surface—and having a pointer which is mounted underneath the graduated disk and has a section which is arranged above the viewing surface of the contour element.

According to the invention, the pointer instrument has a graduated disk which is generally substantially planar but can also have a three-dimensional structure. The graduated disk is preferably fabricated from plastic, in particular from a plastic film. In the edge region, the graduated disk can have marks, for example bars and/or numbers, which, through interaction with a pointer, provide the viewer with information about, for example, a speed, a rotational speed, a temperature, an oil pressure or the like. The graduated disk can additionally have symbols which provide the viewer of the graduated disk with information about the state of, for example, a motor vehicle.

According to the invention, the pointer instrument also has a contour element in the edge region of the graduated disk. This contour element has a surface which is visible to the viewer. The graduated disk and the contour element may have been produced in one piece and, for example, by deep drawing a film or by injection molding. However, the contour element can also be a stand-alone component which is arranged on the graduated disk, preferably bonded thereto. The contour element preferably tapers from its edge in the direction of the graduated disk. The contour element is particularly preferably an annulus or an annular segment, very particularly preferably an annulus or annular segment which tapers conically in the direction of the center of the graduated disk. Graduations, numbers or the like can be arranged on the viewing surface of the contour element.

Furthermore, the pointer instrument has a pointer which is mounted with one end underneath the graduated disk, but has a section, in particular in the region of the nonmounted end, which is arranged above the surface of the contour element. This region is also referred to as a pointer lug. This section preferably extends essentially parallel to the surface of the contour element and/or is arranged at a short distance from the surface. The two preferred embodiments of the present invention improve the reading accuracy of the pointer instrument. The pointer is preferably configured at least partially as a light guide. The light is extracted in the pointer lug and illuminates it. The junctions between the region particularly preferably have angles <90° and/or radii in order to direct as much light as possible through the pointer. Alternatively or additionally, the pointer can have in the corners a reflection surface which is particularly preferably arranged at an angle of 45° with respect to the adjacent surfaces. The pointer is preferably fabricated from a light-guiding plastic which can preferably be deformed and/or is light guiding. Furthermore, the plastic preferably has a metal core which stabilizes the pointer in its respective shape. The pointer does not necessarily have to be fabricated in one piece but rather can comprise a plurality of individual parts which are connected to one another.

The contour element preferably has a cutout. The contour element accordingly preferably does not extend in the entire edge region but rather only in a partial region of the edge. The cutout can be integrally molded into the contour element or formed in it subsequently.

Furthermore, the graduated disk preferably has a cutout. This cutout is preferably arranged in the region of the cutout in the contour element. The cutout can be integrally molded into the graduated disk or formed in it subsequently.

The contour element and/or the graduated disk are preferably partially covered by a panel. The region of the cutout in the contour element and/or the graduated disk is particularly preferably covered.

The pointer is driven by a drive, in particular an electric motor, which is preferably arranged underneath the graduated disk.

The pointer instrument according to the invention is suitable, in particular, as a display in a motor vehicle, in particular for displaying speed, rotational speed, temperature or oil pressure. A further subject matter of the present invention is therefore a motor vehicle having the pointer instrument according to the invention.

An additional subject matter of the present invention is a method for mounting a pointer instrument which has
- a graduated disk and a contour element, wherein the contour element is provided with a cutout, and
- a pointer which has an elongate region with which it is attached to a drive, and has a bent region at its tip, wherein the pointer is made to extend from the edge of the graduated disk in the region of the cutout in the direction of the center of the graduated disk, and is then rotated into the region of the contour element.

A further subject matter of the present invention is a method for mounting a pointer instrument which has
- a graduated disk and a contour element, wherein the contour element is provided with a cutout, and
- a pointer which has an elongate region with which it is attached to a drive, and has a bent region at its tip, wherein the bent region is made to extend through the cutout of the graduated disk from below and is then rotated in the region of the contour element.

The statements made with respect to the pointer instrument apply equally to the methods according to the invention.

The pointer is preferably connected to a drive, in particular an electric motor.

In the text which follows, the inventions will be explained with reference to FIGS. 1-3. These explanations are only exemplary and do not restrict the general inventive idea. The explanations apply to all subject matters of the invention equally.

Figure 2:
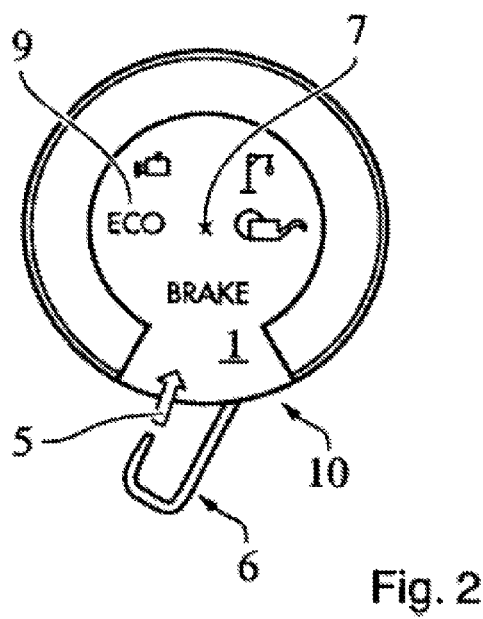
Figure 3:
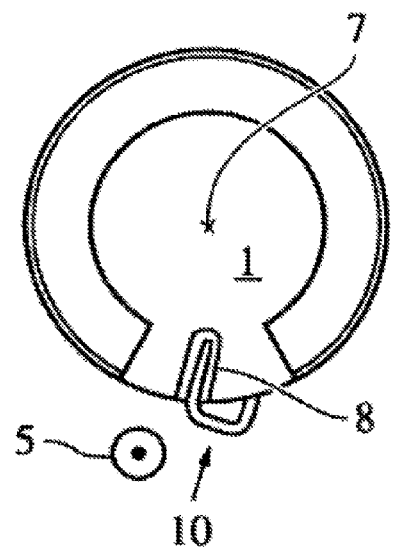

FIG. 1 shows the pointer instrument according to the invention in a sectional view, FIG. 2 shows a method for mounting the pointer, and FIG. 3 shows a further method for mounting the pointer.

FIG. 1 shows the inventive pointer instrument 11 which has a graduated disk 1. A contour element 2, in the present case a conical circular segment which tapers toward the center 7, is arranged in the edge region of the graduated disk. A mount element 4 and a motor 3 are located underneath the graduated disk. The motor 3 is connected to one end of a pointer 6, the other end of which is arranged above the contour element 2 of the pointer instrument. The pointer is composed of an essentially horizontal section 6', a section 6" which is essentially vertical or is arranged at an angle to the vertical, and a section 6''' which is located above the surface 2' of the contour element. The section 6''' extends essentially parallel to the surface 2' of the contour element and/or is at a comparatively short distance therefrom. The angle α between the section 6' and the section 6" is preferably less than 90°. The graduated disk and/or the contour element may have graduations and/or numbers with which it is possible, through interaction with, in particular, the section 6''' of the pointer 6, to read, for example, a speed or the like. The junction between the sections 6" and 6''' is preferably configured as a radius. This embodiment has the advantage that if the pointer is configured as a light guide, as much light as possible passes into the pointer lug 6'''. The inventive pointer instrument is preferably a component of the dashboard of a motor vehicle. The pointer 6, the contour element 2 and/or the graduated disk 1 can be illuminated. Furthermore, the graduated disk can, as illustrated in FIG. 2, have symbols 9 with which further information about the state of the vehicle such as, for example, the filling level of the fuel tank, the battery charge, brake wear, various displays and/or the like, can be displayed to the vehicle occupant. FIG. 2 also shows that the contour element 2 has a cutout 10 at which it is interrupted. In the present case, the graduated disk 1 is a film in whose edge region the contour element is bonded on, therefore giving the graduated disk additional stability. However, it is also possible to manufacture the graduated disk and the contour element in one piece, for example by deep drawing a film. In addition to or instead of the scaling of the graduated disk, the contour element 2 can also have graduations or numbers.

FIG. 2 illustrates a first mounting method of the pointer instrument according to the invention. In this pointer instrument, the contour element has a cutout 10 in the lower region. The pointer is arranged in the region of the cutout 10 in such a way that the section 6' is located underneath the graduated disk 1, and the section 6''' is located above the graduated disk, and the section 6' is arranged parallel to or at an angle to the graduated disk 1. The pointer is then mounted on the mount element 4 and motor 3, as indicated by the mounting direction 5. After the connection to the mount element 4 and/or the motor 3 has been made, the pointer 6 can be rotated in the clockwise or counterclockwise direction into the region of the contour element 2.

FIG. 3 illustrates an alternative mounting method. Compared to the pointer instrument according to FIG. 2, the pointer instrument in the present case has a further cutout 8 which is arranged in the region of the cutout 10 in the graduated disk 1. This cutout 8 can be integrally molded into the graduated disk when it is manufactured or formed in it subsequently. The section 6''' of the pointer 6 is guided through this cutout 8 and in this way the pointer is then connected to the mount element 4 and/or the motor 3. After the connection has been made, the pointer can be rotated in the clockwise direction or counterclockwise direction so that the section 6''' covers the contour element 2. The pointer 6 and the motor 3 can be premounted as one unit, and the pointer can then be placed in position through the cutout. The cutout 8 can then be covered by a panel.

LIST OF REFERENCE SYMBOLS

1 Graduated disk
2 Contour element, annulus
2' Viewing surface of the contour element
3 Drive, motor
4 Mount element for the drive
5 Mounting direction of the pointer
6 Pointer
6' First section of the pointer
6" Second section of the pointer
6''' Third section of the pointer, pointer lug
7 Center of the graduated disk
8 Cutout in the graduated disk
9 Symbols
10 Cutout in the contour element
11 Pointer instrument
α Angle between 6' and 6"

The invention claimed is:

1. A pointer instrument having a graduated disk and a contour element in an edge region thereof—said edge region having a viewing surface—and a pointer, characterized in that the pointer is mounted underneath the graduated disk and has a pointer section which is arranged above the surface of the contour element, wherein the contour element and the graduate disk each have a cutout, the cutout of the contour element and the cutout of the graduated disk are arranged to accept a tip of the pointer and wherein the pointer is a unitary piece and the graduated disk and the contour element are a unitary piece.

2. The pointer instrument as claimed in claim 1, characterized in that the pointer section extends essentially parallel to the viewing surface of the contour element.

3. The pointer instrument as claimed in claim 1, characterized in that the contour element is an annulus.

4. The pointer instrument as claimed in claim 1, characterized in that one or more of a symbol or other information displays are arranged on the graduated disk.

5. The pointer instrument as claimed in claim 1, characterized in that one or more of the contour element or the graduated disk is partially covered by a panel.

6. A display in a motor vehicle having the pointer instrument as claimed in claim 1.

7. The display in a motor vehicle as claimed in claim 6, characterized in that the pointer section extends essentially parallel to the viewing surface of the contour element.

8. The display in a motor vehicle as claimed in claim 6, characterized in that the contour element is an annulus.

9. The display in a motor vehicle as claimed in claim 6, characterized in that one or more of a symbol or other information displays are arranged on the graduated disk.

10. The display in a motor vehicle as claimed in claim 6, characterized in that one or more of the contour element or the graduated disk is partially covered by a panel.

11. A method for mounting a pointer instrument, which has
- a graduated disk having a center, an edge region with a viewing surface, and a contour element in the edge region of the graduated disk, wherein the contour element is provided with a cutout, and
- a pointer which has an elongate region with which it is attached to a drive, has a bent region at its tip, and is made from a unitary piece,
- wherein the graduated disk has a cutout which is arranged in a region of the cutout of the contour element, characterized in that the pointer is mounted underneath the graduated disk and has a section which is arranged above the surface of the contour element and wherein the pointer is made to extend from the edge region of the graduated disk in the region of the cutout of the contour element in a direction of the center of the graduated disk, and is then rotated into the region of the contour element.

12. The method as claimed in claim 11, characterized in that the pointer is connected to the drive.

13. A method, for mounting a pointer instrument which has
- a graduated disk and a contour element, wherein the contour element is provided with a cutout, and
- a pointer which has an elongate region with which it is attached to a drive, and has a bent region at its tip,
- wherein the graduated disk has a cutout which is arranged in a region of the cutout of the contour element, characterized in that the bent region is made to extend through the cutout of the graduated disk from below and is then rotated in the region of the contour element.

14. The method as claimed in claim 13, characterized in that the pointer is connected to the drive.

* * * * *